US 7,782,759 B2

(12) United States Patent
Sridharan et al.

(10) Patent No.: US 7,782,759 B2
(45) Date of Patent: Aug. 24, 2010

(54) ENABLING NETWORK DEVICES TO RUN MULTIPLE CONGESTION CONTROL ALGORITHMS

(75) Inventors: Murari Sridharan, Sammamish, WA (US); Sanjay N. Kaniyar, Redmond, WA (US); Henry L. Sanders, Redmond, WA (US); Abolade Gbadegesin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 11/507,403

(22) Filed: Aug. 21, 2006

(65) Prior Publication Data
US 2007/0248013 A1    Oct. 25, 2007

Related U.S. Application Data

(60) Provisional application No. 60/793,774, filed on Apr. 21, 2006.

(51) Int. Cl.
*H04L 1/00*   (2006.01)
*H04L 12/24*   (2006.01)
*G06F 15/177*   (2006.01)

(52) U.S. Cl. .................. 370/216; 370/230; 370/237; 709/235

(58) Field of Classification Search ...... 370/229–238.1, 370/477; 709/231–235, 238, 241–244, 223–225, 709/229
See application file for complete search history.

(56) References Cited

U.S. PATENT DOCUMENTS

| 5,936,940 | A | 8/1999 | Marin et al. | |
|---|---|---|---|---|
| 6,262,976 | B1 * | 7/2001 | McNamara | ............... 370/254 |
| 6,466,984 | B1 * | 10/2002 | Naveh et al. | ............... 709/228 |
| 6,757,248 | B1 * | 6/2004 | Li et al. | ................. 370/235 |
| 6,839,768 | B2 | 1/2005 | Ma et al. | |
| 7,130,268 | B2 * | 10/2006 | Mascolo | ................ 370/232 |
| 7,369,498 | B1 * | 5/2008 | Ma et al. | ................. 370/235 |
| 7,512,066 | B2 * | 3/2009 | Santos et al. | ............. 370/230 |
| 7,577,097 | B2 * | 8/2009 | Tan et al. | ................. 370/237 |
| 7,656,799 | B2 * | 2/2010 | Samuels et al. | ........... 370/231 |
| 2004/0001691 | A1 | 1/2004 | Li et al. | |
| 2008/0232257 | A1 * | 9/2008 | Hariharan et al. | ......... 370/237 |

OTHER PUBLICATIONS

International Search Report from International Application PCT/US2007/009831.

(Continued)

*Primary Examiner*—Tri H Phan
(74) *Attorney, Agent, or Firm*—Wolf, Greenfield & Sacks, P.C.

(57) ABSTRACT

Creating different congestion control modules (CCMs) that can be plugged into a network communications stack (e.g., a TCP/IP stack). Software abstractions defining transport control events, congestion control algorithms and other information may be exposed by an application programming interface, e.g., of an operating system, and these abstractions may be used to define a CCM. The network communications stack may be configured to select one of multiple available CCMs to control congestion for a given connection. This selection may be based on any of a variety of factors including, but not limited to: network environment; connection path characteristics; connection link characteristics; a value of a socket parameter of an application; other factors; and any suitable combination of the foregoing. Thus, CCMs may be selected and implemented on a per-connection basis.

15 Claims, 7 Drawing Sheets

OTHER PUBLICATIONS

Green et al., "Fedora core 5 Release Notes", Release Notes, [Online], Apr. 15, 2006, pp. 1-46, XP002531262, Retrieved from the Internet: URL:http://docs.fedoraproject.org/release-notes/fc5/release-notes-ISO/>, [retrieved on Jun. 9, 2009].

Anonymous, "Kernel v2.6.13-rc5/Documentation/networking/tcp.txt", Kernel V2.6.13-RC5 Documentation Patch [Online], Jun. 21, 2005, pp. 1-2, XP002531329, Retrieved from the Internet: URL:https://www.linuxhq.com/kernel/v2.6/13-rc5/Documentation/networking/tcp.txt>, [retrieved on Jun. 6, 2009].

Caini et al., "Implementation and Analysis of the TCP Adaptive-Selection Concept in ns-2 and Linux", Advanced Satellite Mobile Systems, 2008, ASMS '08, $4^{th}$, IEEE, Piscataway, NJ, Aug. 26, 2008, pp. 198-203, XP031317928.

* cited by examiner

ENABLING NETWORK DEVICES TO RUN MULTIPLE CONGESTION CONTROL ALGORITHMS

RELATED APPLICATIONS

This application claims benefit under 35 U.S.C. §119(e) to U.S. Provisional Application Ser. No. 60/793,774, titled "ENABLING NETWORK DEVICES TO RUN MULTIPLE CONGESTION CONTROL ALGORITHMS," filed on Apr. 21, 2006, which is hereby incorporated by reference in its entirety.

BACKGROUND

The transmission control protocol (TCP) enables two network devices to establish a connection over a network and to exchange streams of data over the connection in the form of packets. TCP guarantees delivery of data and also guarantees that packets will be delivered in the same order in which they were sent.

TCP employs congestion control algorithms that help defuse network congestion by aggressively throttling the rate at which packets are being transmitted (i.e., sent) from the source. On high bandwidth-delay networks, these aggressive measures result in TCP substantially underutilizing network bandwidth in the presence of even a small percentage of packet loss. For example, some of the Windows® family of operating systems employ a form of TCP that implements the widespread NewReno congestion control algorithm, which performs poorly in high bandwidth-delay environments.

The network research community has proposed several enhancements and modifications to TCP's congestion control algorithm in an attempt to improve its performance in high-speed networks. There are several factors to consider and there is no "one size fits all" solution. The more aggressive the algorithm, the more unfair it is to other TCP flows. Further, because there is no universally accepted standard, the decision on which congestion control algorithm to implement for a given operating system is rather difficult.

SUMMARY

This Summary provides an illustrative context for aspects of the invention, in a simplified form. It is not intended to be used to determine the scope of the claimed subject matter. Aspects of the invention are described more fully below in the Detailed Description.

Disclosed herein are systems, methods and software (e.g., a framework) for creating different congestion control modules (CCMs) that can interact with (e.g., be "plugged into") a network communications stack (e.g., a TCP/IP stack). Software abstractions defining transport control events, congestion control algorithms (CCAs) and other information may be exposed by an application programming interface, e.g., of an operating system. These abstractions may be used to define a CCM type, from which multiple CCMs may be generated (e.g., instantiated).

The network communications stack may be configured to select one of multiple available CCMs to control congestion for a given connection. This selection may be based on any of a variety of factors including, but not limited to: network environment; connection path characteristics; connection link characteristics; a value of a socket parameter of an application; other factors and any suitable combination of the foregoing. Thus, CCMs may be selected and implemented on a per-connection basis, such that multiple CCMs may be operating concurrently.

The network communications stack may report transport control events for a given connection to its corresponding CCM, and the CCM may update the values of one or more state variables for the connection accordingly. The CCM may provide the updated values of the one or more state variables to the network communications stack, and the stack may modify its control of the connection accordingly.

In some embodiments, to reduce the amount of memory consumed by maintaining state information for each connection, information may be sampled from less than all packets transmitted and/or received for a connection. A sampling rate for each connection may be determined based on any of a variety of factors, including, but not limited to, the transmission rate on the connection and the round trip time (RTT) of the connection. A memory pool may be designated for use for congestion control, and a portion of the memory pool may be allocated to each connection based on its sampling rate.

Information may be sampled from packets sent from and/or received on each connection according to the sampling rate of the connection, and the sampled information may be stored in the portion of memory allocated to each respective connection. For example, the time at which a piece of information (e.g., bytes of data) is transmitted may be sampled, and the time at which an acknowledgement for the piece of data is received may be sampled, and this information may be used to determine an RTT for a connection. The sampling rate and amount of memory allocated to each connection may be adjusted as the transmission rate and/or RTT of the connection changes.

In some embodiments, a network interface module, e.g., a network interface card (NIC), may generate timestamps for packets received on a connection. For each packet received from a network, a timestamp may be generated and passed to the network communications stack to be used in controlling congestion on the connection. For example, the network interface module may store timestamp information associating the timestamp and connection in a data structure (e.g., a NET_BUFFER and/or NET_BUFFER_LIST data structure in a Windows® Vista™ operating system). This timestamp information may be used by the network communications stack to determine an RTT and/or other transport control information for the connection. The network communications stack may report the RTT and/or other information to the CCM controlling congestion for the connection. The CCM may update connection state variables, and provide the updated values of one or more connection state variables to network communications stack. The stack then may modify its control of the connection accordingly.

In an embodiment of the invention, a system is provided for creating a congestion control module for controlling congestion on a network connection. The system includes an application programming interface exposing one or more event abstractions for use in defining congestion control module types from which congestion control modules may be generated, each event abstraction defining a transport control event.

In another embodiment of the invention, a system for controlling congestion on one or more network connections between a network device and a communications network is provided. The system includes a network communications stack operative to control network communications on the one or more connections, and one or more congestion control modules, each congestion control module defining a congestion control algorithm to control congestion on a respective one of the one or more network connections and maintaining one or more connection state variables for the respective connection. The network communications stack is operative, for each of the one or more connections, to notify the congestion control module that controls congestion on the connection of one or more transport control events that occur on the connection.

In another embodiment of the invention, a computer program product is provided. The computer program product includes a computer-readable medium and computer-readable signals, stored on the computer-readable medium, that define instructions that, as a result of being executed by a computer, control the computer to perform a method of controlling congestion on a network connection between a network device and a communications network. The method includes acts of: selecting a first type of congestion control for a first connection; generating a first congestion control module of the first type; and controlling network congestion on the first connection using the first congestion control module.

In another embodiment of the invention, congestion on a network connection is controlled. A rate at which to sample information from packets transmitted from a network device on the network connection is determined based, at least in part, on a transmission rate of the network connection and a round trip time for the connection. Information from packets transmitted on the connection is sampled at the determined sampling rate, congestion on the network connection is controlled based at least in part on the sampled information.

In yet another embodiment of the invention, a system is provided for controlling congestion on a network connection. The system includes a network communications stack operative to determine a rate at which to sample information from packets transmitted from a network device on the network connection based, at least in part, on a transmission rate of the network connection and a round trip time for the connection, to sample, at the determined sampling rate, information from packets transmitted on the connection, and to control congestion on the network connection based at least in part on the sampled information.

In another embodiment of the invention, a computer program product is provided, which includes a computer-readable medium and computer-readable signals, stored on the computer-readable medium, that define instructions that, as a result of being executed by a computer, control the computer to perform a method of controlling congestion on a network connection. The methods includes acts of: determining a rate at which to sample information from packets transmitted from a network device on the network connection based, at least in part, on a transmission rate of the network connection and a round trip time for the connection; sampling, at the determined sampling rate, information from packets transmitted from the connection; and controlling congestion on the network connection based at least in part on the sampled information.

In another embodiment of the invention, congestion on a network connection between a network device and a communications network is controlled. The network device includes a network communications stack and a separate network interface module. At the network interface module, a packet is received on the network connection from the communications network. A timestamp is generated on the network interface module, the timestamp corresponding to a time at which the packet was received. Information associating the timestamp with the packet is stored in a data structure accessible by the network communications stack, and the packet is sent to the network communications stack.

In yet another embodiment of the invention, a system is provided for controlling congestion on a network connection between a network device and a communications network. The network device includes a network communications stack. The system includes a network interface module operative to receive a packet on the network connection from the communications network, to generate a timestamp on the network interface module, the timestamp corresponding to a time at which the packet was received, to store information associating the timestamp with the packet in a data structure accessible by the network communications stack, and to send the packet to the network communications stack.

In another embodiment of the invention, a computer program product is provided, which includes a computer-readable medium and computer-readable signals, stored on the computer-readable medium, that define instructions that, as a result of being executed by a computer, control the computer to perform a method of controlling congestion on a network connection between a network device and a communications network. The network device includes a network communications stack and a separate network interface module. The method includes acts of: at the network interface module, receiving a packet on the network connection from the communications network; generating a timestamp on the network interface module, the timestamp corresponding to a time at which the packet was received; storing information associating the timestamp with the packet in a data structure accessible by the network communications stack; and sending the packet to the network communications stack.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

DETAILED DESCRIPTION

In the absence of explicit congestion notification, some transport layer protocols (e.g., TCP) rely on certain events to detect incipient congestion, packet loss and queue build up at a "bottleneck" router. Current research in congestion control can be broadly classified as either loss-based, which relies on packet loss as indication of congestion, or delay-based, which monitors buffer occupancy at a bottleneck router to proactively avoid congestion. The delay-based schemes deduce queue build up by monitoring increases in RTTs of connections.

Embodiments of the invention described herein may be used to implement delay-based and/or loss-based congestion control. For example, as described in more detail below, one or more event abstractions, congestion control algorithm (CCA) abstractions and abstractions defining other information associated with congestion control may be exposed through an interface. These abstractions may be used to define one or more congestion control modules (CCMs) to control congestion on one or more respective connections using delay-based and/or loss-based schemes.

The function and advantage of embodiments of the present invention described above and other embodiments will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
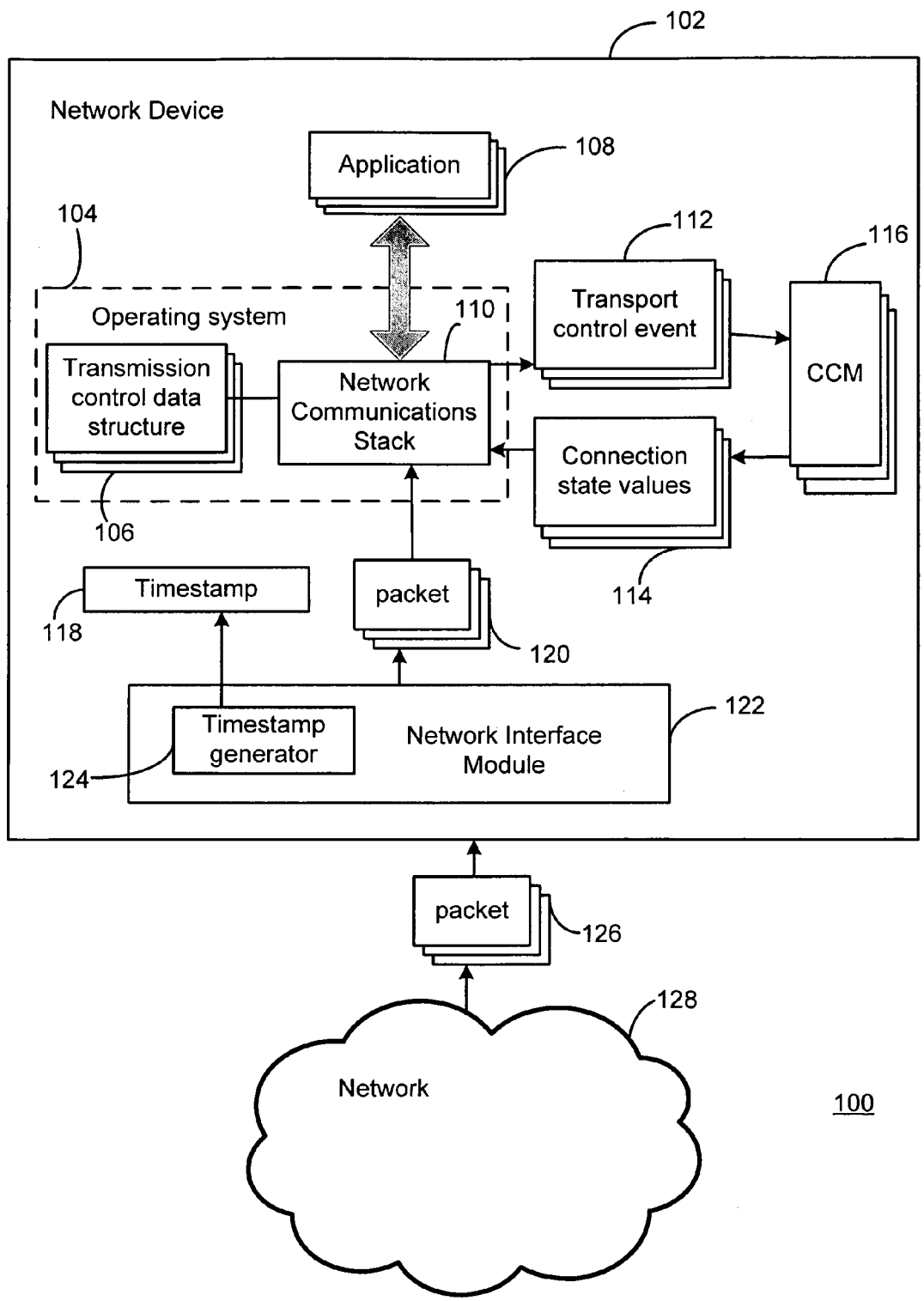
FIG. 1 is a block diagram illustrating an example of a system for controlling congestion on one or more network connections between a network device and communication network, according to some embodiments of the invention.

FIG. 1 is a block diagram illustrating an example of a system 100 for controlling congestion on one or more network connections between a network device 102 and communication network 128, according to some embodiments of the invention. System 100 is merely an illustrative embodiment of a system for controlling congestion on one or more network connections between a network device and a communications network, and is not intended to limit the scope of the invention. Any of numerous other implementations of such a system, for example, variations of system 100, are possible and are intended to fall within the scope of the invention.

As used herein, a "network" is a group of two or more components interconnected by one or more segments of transmission media over which communications may be exchanged between the components. Each segment may be any of a plurality of types of transmission media, including one or more electrical or optical wires or cables made of metal and/or optical fiber, air (e.g., using wireless transmission over carrier waves) or any combination of these transmission media. As used herein, "plurality" means two or more. It should be appreciated that a network may be as simple as two components connected by a single wire, bus, wireless connection, or other type of segment. Further, it should be appreciated that when a network is illustrated in a drawing of this application as being connected to an element in the drawing, the connected element itself is considered part of the network.

As used herein, a "network device" is a device operative to communicate on a network, including, but not limited to: workstations, personal computers, terminals, laptop computers, end stations, user devices, servers, gateways, registers, switches, routers, hubs, bridges, directories, transmitters, receivers, transceivers, wireless access points (APs), repeaters, and any combinations thereof. As used herein, a "user device" is a network device from/to which a user may send/receive communications, and which may serve as an endpoint to communications on a communications network. User devices include, but are not limited to: workstations; personal computers (e.g., PCs); laptop computers, notebook computers; telephones (e.g., landline or mobile); pagers; Blackberry™ brand devices, PCS devices, personal digital assistants (PDAs), two-way radios (e.g., "walkie-talkies"), other types of user devices, and any suitable combination of the foregoing.

A network may be or include any of a variety of types of networks including, but not limited to, a local area network (LAN), a metropolitan area network (MAN), a wide-area network (WAN), a wireless network, a Public Land Mobile Network (PLMN), a Global System for Mobile Communications (GSM) network, a General Packet Radio Service (GPRS) network, a Universal Mobile Telecommunications System (UMTS) network, a Code-Division Multiple Access (CDMA) network, an optical network, a data network, an enterprise-wide network, a wireless personal area network (PAN), a home network, a telecommunications network, a public switched telephone network (PSTN), a broadband network, another type of network, or any suitable combination of the foregoing.

Network device 102 may include any of: one or more applications 108; operating system 104; network interface module 122; one or more congestion control modules (CCMs) 116; other components; or any suitable combination of the foregoing.

Network interface module 122 may be any of a variety of types of network components, such as, for example, a network interface card (NIC). Module 122 may be configured to receive packets 126 from network 128, for example, on one or more network connections, and perform operations on the packets. For example, network interface module 122 may perform any of a variety of well known operations. Further, module 122 may be configured to generate timestamps for packets when they are received. For example, the timestamp generator 124 may generate a timestamp at a time as close as possible to the time at which each packet is received. Information associating the timestamp 118 with the packet (i.e., timestamp information) may be stored in a data structure (e.g., a NET_BUFFER or NET_BUFFER_LIST data structure of a Windows® Vista™ operating system). This data structure (or the timestamp information stored therein) may be passed or made accessible to network communications stack 110. As will be described in more detail below, the timestamp information may be used to determine network congestion on a network connection.

Operating system 104 may include any of: one or more transmission control data structures 106; network communications stack 110; other components; and any suitable combination of the foregoing. Network communications stack 110 may be any of a variety of types of network communications stack such as, for example, a TCP/IP stack. Network communications stack 110 may be configured to receive packets 120 and control the connections on which packets 120 are received (and on which packets are transmitted). Although not shown in FIG. 1 or discussed throughout this application, it should be appreciated that network communications stack 110 also may be configured to transmit packets to network 128, for example, through network interface module 122.

Stack 110 may make use of the one or more transmission control data structures 106 to control connections between network device 102 and network 128. For example, for each connection, a separate transmission control data structure 106 may be used to store and update information relating to the connection (e.g., state information), which the stack 110 can use to control communications on the connections. Transmission control data structure 106 may be or include any of a variety of types of data structures, such as, for example, a transmission control block (TCB). Although transport control data structures 106 is shown as residing within the operating system 104, the invention is not so limited. Such structures can reside at any of a variety of locations on network device 102, including on network interface module 122.

Stack 110 may be configured to detect and/or determine one or more transport control events, update one or more transmission control data structures 106 accordingly, and/or report these one or more transport control events 112 to one or more CCMs 116. These events may include any of the following: retransmission timeout on a connection; return trip time changes; new data acknowledge; reception of a duplicate acknowledgement; sending of a new data packet; other transport control events or any suitable combination of the foregoing.

In a typical transport layer (layer 4) protocol (e.g., TCP), when a network device (e.g., the recipient) receives data on a connection, it responds to the network device that sent the data (e.g., the sender with an acknowledgement (i.e., ACK). A retransmission timeout occurs on the sender (e.g., network device 102) for a connection when an acknowledgement message for data previously sent by the sender on the connection has not been received from the recipient within a predefined amount of time. The occurrence of a retransmission timeout may result in the retransmission of the data for which the timeout occurred.

A round trip time (RTT) is an amount of time that elapses between when a sender sends data to another entity and when the sender receives an acknowledgement from the other entity that the data was received. RTT information can be used to set the timer for the retransmission timeout. An RTT change occurs when the RTT for a given connection changes, for example, as a result of increased or decreased network congestion on a connection.

When data is transmitted between a sender and recipient over a network, the data is often divided into pieces, i.e., groups of bytes, and these groups of bytes are sent in packets. Although the pieces of data are transmitted in an order in which they were originally arranged, the pieces of data (and the packets that contain them) can arrive in a different order at the recipient.

A typical transport layer protocol, such as, for example, TCP, keeps track of the order of the pieces and which pieces are received at the recipient, and reassembles the pieces into the appropriate order. The recipient sends acknowledgements to a sender of a packet indicating which pieces of data that it has received, and may indicate those pieces it has not yet received. For example, consider data divided into pieces 1-90. If a recipient of this data receives pieces 1-20 in one packet, 31-60 in another packet and 61-90 in a third packet, it may send an acknowledgement to the sender each time it receives one of these packets. The acknowledgement indicates which pieces it has received, and also may indicate which pieces of the data it has not received yet. For example, a recipient may receive a first packet including pieces 1-20, and send an acknowledgement indicating that it has received pieces 1-20. It then may receive a packet including pieces 31-60, and send an acknowledgement that it has received 1-20 and 31-60, but not pieces 21-30. It may receive another packet including pieces 61-90, and send an acknowledgement that it has received 1-20 and 31-90, but not 21-30. Thus, the sender may receive multiple acknowledgements from the recipient indicating that the recipient has not yet received pieces 21-30.

A new data acknowledgement is a first or initial acknowledgement received by the sender for a particular piece of data, according to the transport layer protocol, indicating that the piece of data was received by the recipient.

A duplicate acknowledgement is any acknowledgement other than a first acknowledgement indicating that a particular piece of data has not been received by a recipient. Reception of a duplicate acknowledgement may be indicative of a hole (e.g., pieces 21-30) in the data received by the recipient.

Network communications stack 110 may be configured to detect these one or more transport control events, and other events, by examining relevant information within packets 120 received from network interface module 122. That is, in addition to processing packets 120 before passing their contents to one or more applications 108, stack 110 also may examine information within these packets controlling their transport, including controlling congestion on the connection(s) on which these packets are transmitted. In some embodiments, stack 110 may sample information from less than all of the packets that it receives. This sampling may be performed to reduce the amount of state information that is necessary to be maintained for each connection by its respective CCM 116. The sampling rate for each connection may be determined based on a transmission rate and an RTT of the connection. Such sampling may be performed as described below in more detail in relation to FIGS. 4-7.

As used herein a "congestion control module" or "CCM" is a software abstraction that defines a CCA for controlling congestion on one or more connections. Each CCM 116 may correspond to only one connection between network device 102 and an entity on network 128, and each CCM may implement a particular type of CCA. The network communications stack 110 may report to a CCM 116 transport control events for a connection for which the CCM is controlling congestion. A CCM 116 may maintain connection state variables for a connection, and may update these state variables in response to transport control events. The CCM may provide the updated values of the state variables to the network communications stack 110, and the stack may modify its control of the connection accordingly. During the lifetime of a given connection, a CCM 116 may be allocated a portion of memory to control the connection, and this portion of memory may remain opaque to the stack 110 and transmission control data structure 106. This portion of memory may be owned by the CCM and used to track and update the connection state variables used to control congestion on the connection.

The network communications stack 110 may be configured to select one of multiple available CCMs 116 to control congestion for a given connection. This selection may be based on any of a variety of factors including, but not limited to: network environment; connection path characteristics; connection link characteristics; a value of a socket parameter of an application 108; other factors and any suitable combination of the foregoing. That is, CCMs 116 may be selected and implemented on a per-connection basis by stack 110, and multiple CCMs 116 may operate concurrently. Each of these CCMs may be of a different type, or two or more of these CCMs may be of a same type (i.e., run a same type of CCA).

In some embodiments of the invention, when certain versions of Windows® (e.g., Windows® Vista™) are employed as an operating system, a network programming interface (NPI) may be provided. The NPI may assist in developing and configuring a network interface between a network device (e.g., device 102) and a network (e.g., 128). The NPI may provide a data structure (e.g., a Network Module Registrar (NMR)) that allows the association of one or more CCMs 116 with network communications stack 110. For example, the stack 110 (e.g., the tcp.sys driver in Windows® Vista™) may register as a CCM client, and one or more CCMs 116 may register as CCM "providers." NPI for Windows® Vista™, including the use of the NMR, is described in more detail in the Microsoft Developers Network (MSDN) library at http://msdn.microsoft.com/library within the following directory: Device and Driver Technologies/Network/Windows Codename Longhorn Networking.

In some embodiments of the invention, a CCM may be generated (e.g., instantiated) using a CCM type abstraction. A CCM type abstraction may be defined using one or more predefined software abstractions (e.g., object types), which may be provided by a CCM API, for example, as described below in relation to FIG. 2.

Figure 2:
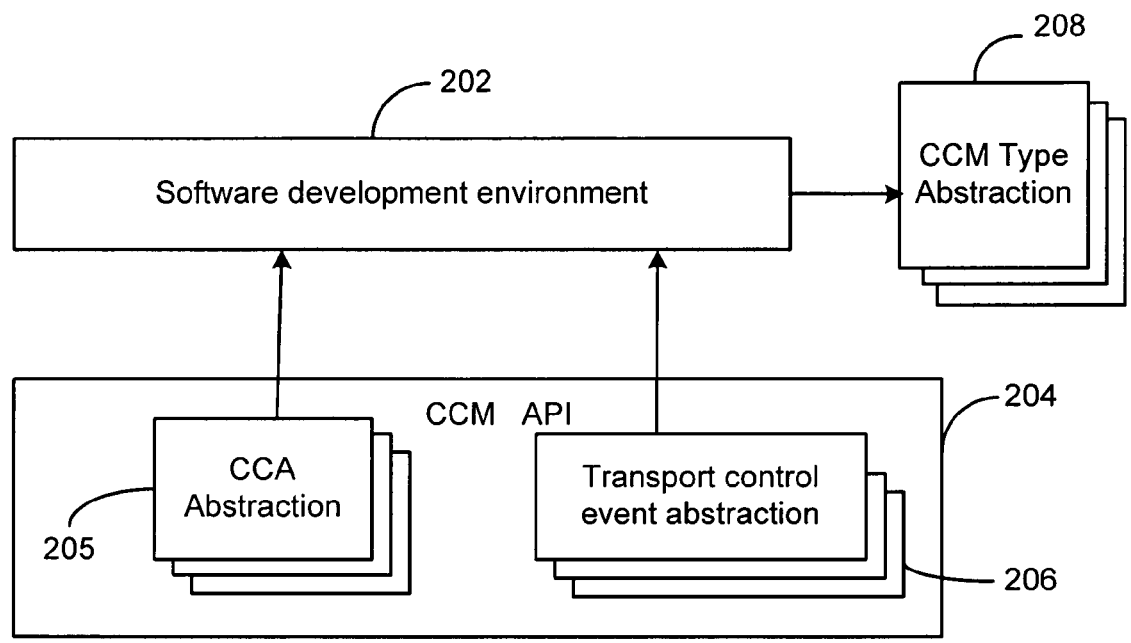
FIG. 2 is a block diagram illustrating an example of a system for defining CCM types for controlling congestion on a network connection, according to some embodiments of the invention.

FIG. 2 is a block diagram illustrating an example of a system 200 for defining a CCM type for controlling congestion on a network connection, according to some embodiments of the invention. System 200 is merely an illustrative embodiment of system for defining CCM types, and is not intended to limit the scope of the invention. Any of numerous other implementations of such a system, for example, variations of system 200, are possible and are intended to fall within the scope of the invention.

As will become more evident from the following description, in some embodiments of the invention, system 200 alone and/or in combination with system 100 provides one or more of the following properties: an easy way to implement any of a variety of types of CCA; the ability for someone (e.g., a programmer or developer) to write a CCA without having to look at the TCP code; the ability to select a CCM from a plurality of available CCMs on a per-connection basis, e.g., based on the network environment, path and/or link characteristics, through a socket option, etc.; the ability to control how much data is sent on a connection; and the ability to control which bytes of data are sent on a connection.

System 200 may include any of: software development environment 202; CCM application programming interface (API) 204; other components; or any suitable combinations of the foregoing. As used herein, an "application programming interface" or "API" is a set of one or more computer-readable instructions that provide access to one or more other sets of computer-readable instructions that define functions and/or data types, so that such functions and/or data types can be configured to be executed on a computer in conjunction with an application program. An API may be considered the "glue" between application programs and a particular computer environment or platform (e.g., any of those discussed herein) and may enable a programmer to program applications to run on one or more particular computer platforms or in one or more particular computer environments.

A CCM type may be developed in the software development environment 202 at least in part by using CCM API 204, which may be provided by an operating system (e.g., 104) of a network device (e.g., 102). In some embodiments of the invention, CCM API 204 may be, or may be included as part of, an NPI of an operating system such as, for example, Windows® Vista™.

CCM API 204 may include any of: one or more CCA abstractions 205; one or more transport control event abstractions 206; other components; or any suitable combination of the foregoing. Each transport control event abstraction 206 may define a particular transport control event such as, for example, any of the transport control events described above. Further, CCM API 204 may provide one or more CCA abstractions 205. Each CCA abstraction may define a particular type of CCA such as, for example, a default CCA, NewReno; CTCP; HSTCP; BIC; Fast; other types of CCAs, or any suitable combination of the foregoing.

Thus, CCM API may expose one or more CCA abstractions 205, one or more transport control event abstractions 206 and other abstractions defining information that may be used by a software development environment 202 to define one or more CCM type abstractions 208, from which one or more CCMs may be generated. For example, in some embodiments in which Windows® Vista™ is employed, one or more CCM types may bind with one or more abstractions 205 and 206 by registering with an NMR. In such an embodiment, the network communications stack 110 (e.g., tcpip.sys) may register as a CCM client, and multiple CCM type abstractions 208 may register with the stack 110 using the NMR.

In some embodiments of the invention, CCM API 204 and software development environment 202 may be part of a CCM framework provided by system 200, which may be used to assist in developing CCM types. As used herein, a "framework" is a re-usable design structure including one or more predefined software components (e.g., abstract and/or concrete classes of an object-oriented programming language) that assist in building applications. Thus, a "CCM framework" is a re-usable design structure including one or more predefined software components (e.g., CCA abstractions 205, transport control event abstractions 206, other abstractions, and any suitable combination of the foregoing), which assist in building CCM type abstractions.

In some embodiments of the inventions, the transport control event abstraction(s) 206 and abstraction(s) defining information associated with transport control events are defined using the C programming language. Such abstractions may include, but are not limited to, any of the following:

```
typedef enum {
    CcmTimeoutEvent = 0x1,
    CcmRttSampleEvent,
    CcmCumulativeAckEvent,
    CcmDuplicateAckEvent,
    CcmSendEvent
} CcmEventType;
typedef struct {
    PULONG Cwnd;
    PULONG SsThresh;
}CCM_CONGESTION_STATE_INFORMATION;
typedef struct {
    BOOLEAN InRecovery;
    ULONG RecoveryUna;
    ULONG RecoveryNxt;
    ULONG RecoveryMax;
}CCM_LOSS_RECOVERY_INFORMATION;
typedef struct {
    ULONG RetransmitCount;
    ULONG Mss;
    ULONG SndWnd;
```

-continued

```
    ULONG MaxSndWnd;
}CCM_RETRANSMIT_TIMEOUT_INFORMATION;
typedef struct {
    ULONG SRtt;
    ULONG RttVar;
    ULONG RttSample;
} CCM_RTT_SAMPLE_INFORMATION;
typedef struct {
    ULONG SeqAcked;
    ULONG BytesAcked;
    ULONG Mss;
    ULONG SndWnd;
    ULONG MaxSndWnd;
#ifdef __cplusplus
    CCM_LOSS_RECOVERY_INFORMATION Recovery;
#else
    CCM_LOSS_RECOVERY_INFORMATION;
#endif
}CCM_CUMULATIVE_ACK_INFORMATION;
typedef struct {
    ULONG DupAckCount;
    ULONG SndUna;
    ULONG Mss;
    ULONG SndWnd;
    ULONG MaxSndWnd;
#ifdef __cplusplus
    CCM_LOSS_RECOVERY_INFORMATION Recovery;
#else
    CCM_LOSS_RECOVERY_INFORMATION;
#endif
}CCM_DUPLICATE_ACK_INFORMATION;
typedef struct {
    ULONG SeqNumber;
    ULONG SendLength;
}CCM_SEND_PACKET_INFORMATION;
typedef
NTSTATUS
(NTAPI *PCCM_PROVIDER_NOTIFY_EVENT)(
    IN HANDLE TcpCcmState,
    IN CcmEventType CcmEvent,
IN PVOID CcmInformation,
OUT PCCM_CONGESTION_STATE_INFORMATION
CongestionState
);
```

It should be appreciated that other abstractions defining other events and related information may be provided by CCM API 204, and may be removed or added from/to the API over time.

Further, in some embodiments of the inventions, one or more CCA abstractions exposed by CCM API 204 are defined using the C programming language. Such abstractions may include, but are not limited to, any of the following:

```
    typedef enum {
        TcpCcmDefault,
        TcpCcmNewReno,
        TcpCcmCtcp,
        TcpCcmHstcp,
        TcpCcmBic,
        TcpCcmFast,
        TcpCcmReserved1,
        TcpCcmReserved2,
        TcpCcmReserved3,
        TcpCcmMAX
    } TcpCcmType;
```

It should be appreciated that other abstractions defining other CCAs and related information may be provided by CCM API 204, and may be removed or added from/to the API over time. In embodiments in which Windows® Vista™ are employed, a CCM type abstraction 208 may register to implement one of the foregoing CCAs. For example, a CCM type abstraction may be defined, at least in part, using the following abstraction defined in the C programming language.

```
    typedef struct _CCM_PROVIDER_CHARACTERISTICS {
        USHORT Version;
        USHORT Length;
        //
        // Congestion control algorithm that this provider implements
        //
        TcpCcmType CcmAlgorithm;
        //
        // Congestion control state that this algorithm requires. The
        // size is specified in bytes
        //
        ULONG Size;
    }CCM_PROVIDER_CHARACTERISTICS;
```

In some embodiments in which the C programming language is employed. A CCM type abstraction may use one of the following abstractions defining functions for initialization and cleanup of a CCM:

```
typedef
NTSTATUS
(NTAPI *PCCM_PROVIDER_INITIALIZE_CONNECTION)(
    IN OUT HANDLE TcpCcmState
    );
typedef
NTSTATUS
(NTAPI *PCCM_PROVIDER_CLEANUP_CONNECTION)(
    IN OUT HANDLE TcpCcmState
    );
typedef struct _CCM_PROVIDER_DISPATCH {
    USHORT Version;
    USHORT Length;
    //
    // Initialize connection with provider specific congestion state
    //
    PCCM_PROVIDER_INITIALIZE_CONNECTION CcmInitialize;
    //
    // Clean up
    //
    PCCM_PROVIDER_CLEANUP_CONNECTION CcmCleanup;
    //
    // Notify Ccm Event
    //
    PCCM_PROVIDER_NOTIFY_EVENT CcmNotifyEvent;
} CCM_PROVIDER_DISPATCH, *PCCM_PROVIDER_DISPATCH;
```

Systems 100 and/or 200 and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of systems 100 and/or 200 may reside on a single device (e.g., a computer), or one or more components may reside on separate, discrete devices. Further, each component may be distributed across multiple devices, and one or more of the devices may be interconnected.

Further, on each of the one or more devices that include one or more components of systems 100 or 200, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. Systems 100 and/or 200, and components thereof, may be implemented using a computer system such as that described below in relation to FIGS. 8 and 9.

Figure 3:
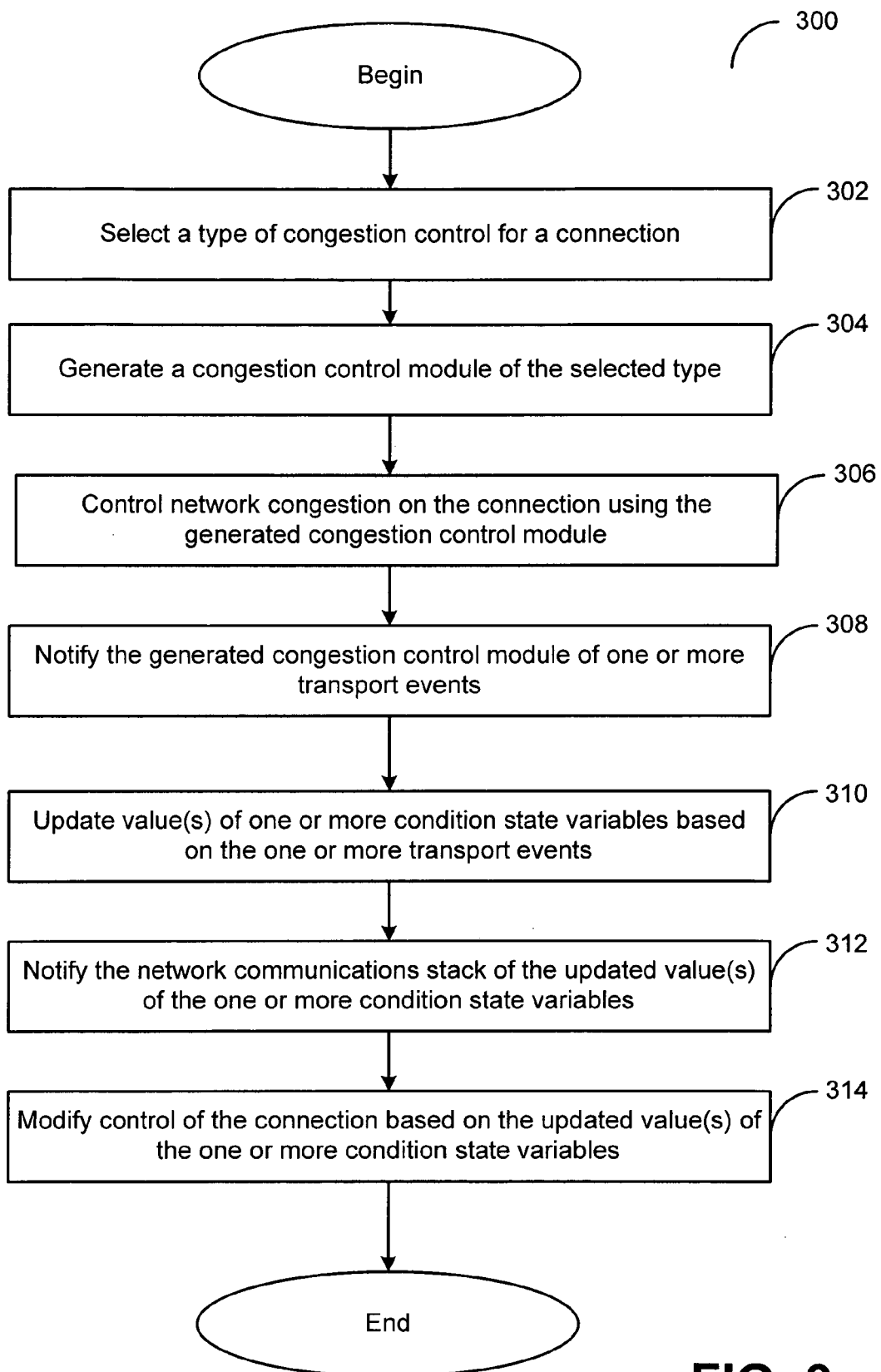
FIG. 3 is a flowchart illustrating an example of a method of controlling congestion on a network connection, according to some embodiments of the invention.

FIG. 3 is a flowchart illustrating an example of method 300 of controlling congestion on a network connection, according to some embodiments of the invention. Method 300 is merely an illustrative embodiment of a method of controlling congestion on a network connection and is not intended to limit the scope of the invention. Numerous other implementations, for example, variations of method 300, are possible and are intended to fall within the scope of the invention.

In Act 302, a type of congestion control may be selected, for example, by a network communications stack (e.g., stack 110) as described above in relation to system 100.

In Act 304, a CCM of the selected type may be generated (e.g., from a CCM type abstraction 208), and in Act 306, network congestion on a connection may be controlled using the generated CCM. Each of Acts 304 and 306 may be performed as described above in relation to systems 100 and 200.

During the life of the connection, in Act 308, the generated congestion control module may be notified of one or more transport events, for example, by stack 110 as described above in relation to system 100.

In Act 310, the value of one or more connection state variables may be updated (e.g., by the generated CCM) based on the one or more transport events, and in Act 312, the network communications stack may be notified (e.g., by the CCM) of the updated value of the one or more connection state variables, for example, as described above in relation to system 100.

Control of the connection may be modified in Act 314 (e.g., by stack 110) based on the updated value of the one or more connection state variables, for example, as described above in relation to system 100.

Method 300 may include additional acts. Further, the order of the acts performed as part of method 300 is not limited to the order illustrated in FIG. 3, as the acts may be performed in other orders and/or one or more the acts may be performed in parallel, at least partially. For example, any of Acts 308-314 may be performed for one or more events or variables concurrently to the performance of any of the acts for another connection.

The network communication stack 110 may consume a significant amount of memory in recording transport control events, for example, as part of implementing a delay-based CCA. That is, a massive amount of state information may be maintained for each connection.

In some embodiments of the invention, the amount of memory consumed by state information per connection is reduced by sampling information from less than all of the packets transmitted and/or received on one or more connections. Information may be sampled from less than all packets while still maintaining a high enough sampling rate to detect congestion in a timely manner, for example, by detecting a change in the RTT for a connection. If the sampling rate were too low, then the determination of congestion may be too late to modify the transmission of information on the connection to prevent an overflowing of a bottleneck buffer.

In some embodiments of the invention, the sampling rate of a connection is based on a bandwidth-delay product (BDP) of the connection; i.e., the product of a connection speed of a connection and the RTT of the connection (i.e., speed*RTT). Thus, if the connection speed is expressed in megabits per second (Mbps) and the RTT is expressed in seconds, then the BDP may be expressed in units of bits or bytes. A congestion window for a connection can be determined based on the BDP of the connection. As used herein, a "congestion window" is a maximum amount of data that is allowed to be "in flight" for a given connection at any given time. For example, the congestion window may define the maximum number of packets for a connection that: 1) have been transmitted; and 2) for which an acknowledgement has not yet been received. A network communications stack (e.g., 110) may be configured to utilize the value of a congestion control window to control the transmission of data onto the connection, so that no more than the maximum allowed number of packets for the connection are in flight (i.e., no more than the congestion window) until an acknowledgement has been received for one of the packets in flight.

Table 1 below illustrates sampling rates, for a connection having an RTT of 100 ms, that the inventors have determined by experiment to have an acceptable balance of: 1) the amount of memory consumed to maintain state information for the connection; and 2) the ability to identify congestion on the connection in a timely manner. A sampling rate is the number of packets transmitted on a connection from which information is sampled, per round. A "round" is defined as follows. Consider a connection on which data has just started being transmitted. In response to an acknowledgement (i.e., "ACK") for the first piece of the data (i.e., "segment") was transmitted being received, a sequence number (described below; or other identifier) of a last segment of the data which was transmitted but for which an ACK has not been received may be recorded (e.g., in a variable called "RoundEnd"). The round ends when we an ACK for this last segment is received.

The first column in Table 1 indicates the speed of the connection. The second column indicates the congestion window (in units of packets) defined for the connection for: an RTT=100 ms; and the connection speed defined in the first column. The third column defines the acceptable sampling rate, in units of packets sampled per round, which was determined experimentally. For example, the third row indicates that, for a connection speed of 1 Gbps and an RTT of 100 ms, for which a congestion window of 8,333 packets has been defined, a sampling rate of 128 packets per round has been determined to be acceptable. It should be appreciated that the invention is not limited to the values shown in the table, as other values may be used and are intended to fall within the scope of the invention.

TABLE 1

Sampling Rates for Different Connection Speeds for an RTT of 100 ms

| Connection Speed | Congestion Window (expressed in packets) | Sampling Rate |
|---|---|---|
| 10 Mbps | 83 | 32 |
| 100 Mbps | 833 | 64 |
| 1 Gbps | 8333 | 128 |
| 2.5 Gbps | 20833 | 192 |
| 10 Gbps | 83333 | 256 |

Figures 4, 5:
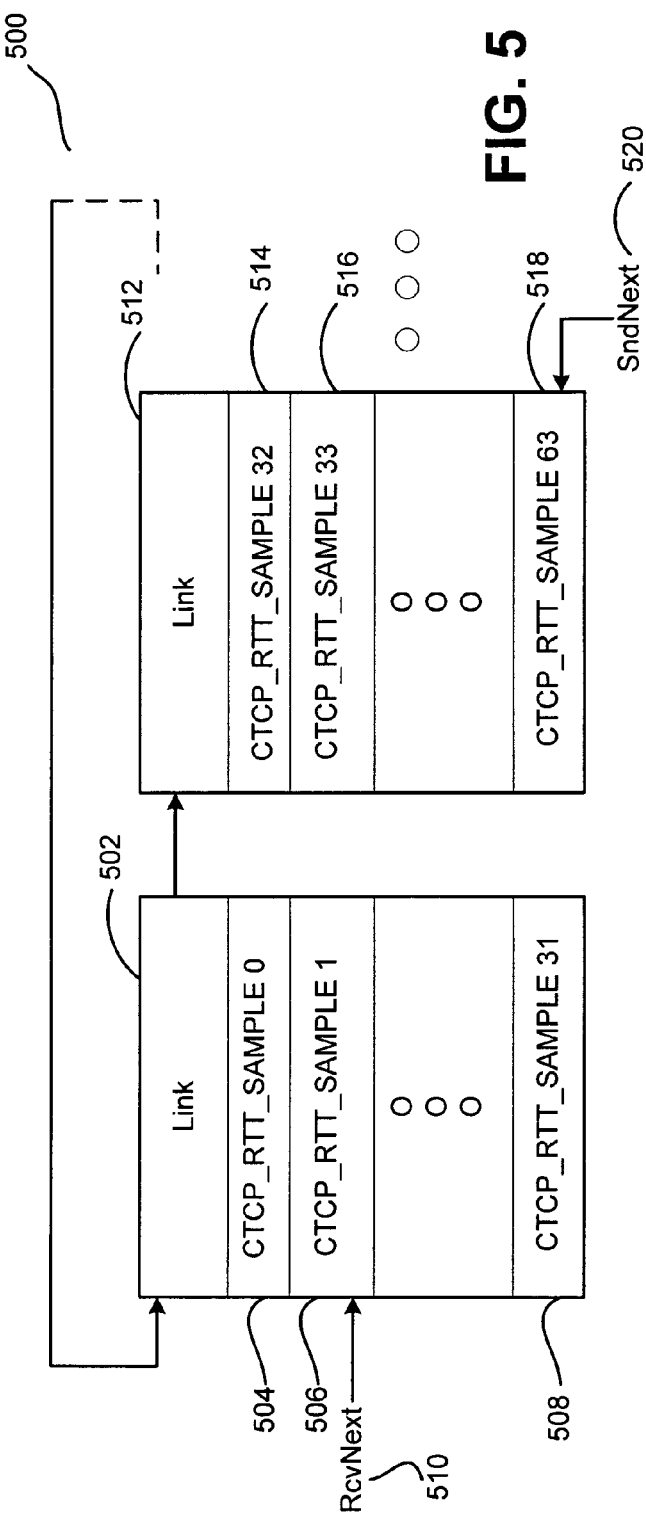
FIG. 4 is a table illustrating an example of sampling rates for connections for certain combinations of connection speed and RTT, according to some embodiments of the invention.
FIG. 5 is a block diagram illustrating an example of a data structure for storing information sampled from packets received on a connection, according to some embodiments of the invention.

FIG. 4 is a table 400 illustrating an example of sampling rates for connections for certain combinations of a connection speed and RTT, according to some embodiments of the invention. It should be appreciated that the invention is not limited to the values shown in FIG. 5, as other values may be used and are intended to fall within the scope of the invention.

The sampling rates in column 404 correspond to the sampling rates shown in the third column of Table 1 above. Columns 406-412 illustrate that for a given connection speed, a designated sampling rate is a function of RTT. For a given connection speed (i.e., a given row), a position further to the right in table 400 corresponds to a higher RTT, and a corresponding higher sampling rate being designated, with the sampling rate being capped at 256 packets per second regardless of connection speed and RTT.

In some embodiments of the invention, a pool of memory is shared between multiple (e.g., all) connections on the network device, or, in a multi-processor embodiment, by multiple (e.g., all) connections for a given processor, for the purposes of sampling information to control congestion. This pool may be of a fixed size, and slots from the memory pool may be allocated and de-allocated to connections (e.g., by a network communications stack, e.g., 10) on a need basis. That is, the amount of memory (i.e., the number of slots) from the memory pool allocated to a connection may be based on the of data currently being transmitted and/or received on the connection. As used herein, the term "exchanged" means transmitted and/or received. Thus, the amount of memory allocated to each connection is not based solely on the calculated BDP of the connection, but rather the amount of data actually being exchanged on the connection.

For example, a bursty connection may increase its congestion window to a large value (i.e., a value equal to the BDP for the connection), and as a result be allocated more memory from the pool. However, the connection will not continue to be allocated the increased amount of memory unless it maintains the rate of data exchange; i.e., unless it keeps the amount of data in flight defined by its congestion window.

This technique for sharing a memory pool between connections on a need basis, for the purpose of congestion control, is a more efficient use of memory than pre-allocating memory to connections (e.g., based purely on BDP) regardless of actual data exchanged on the connections.

In some embodiments of the invention, the following data structure may be used to define a sample:

```
typedef struct _CTCP_RTT_SAMPLE{
    SEQ_NUM Seq;   // Send Sequence
    ULONG Time;    // Send Time
} CTCP_RTT_SAMPLE, *PCTCP_RTT_SAMPLE;
``` and the following data structure may be used for recording and tracking information sampled from packets for the purpose of controlling congestion on a connection:

```
#define CTCP_DWND_RTT_SAMPLES_NUM 32
typedef struct _CTCP_RTT_SAMPLE_TABLE {
    LIST_ENTRY Link;
    CTCP_RTT_SAMPLE
    RttSamples[CTCP_DWND_RTT_SAMPLES_NUM];
}CTCP_RTT_SAMPLE_TABLE, *PCTCP_RTT_SAMPLE_TABLE;
```

The foregoing data structure definitions may be used to construct the data structure illustrated in FIG. 5. FIG. 5 is a block diagram illustrating an example of a data structure 500 for storing information sampled from packets received on a connection, according to some embodiments of the invention. FIG. 5 is merely an illustrative embodiment of a data structure for storing information sampled from packets received on a connection, and is not intended to limit the scope of the invention. Other data structures, for example, variations of structure 500, may be used and are intended to fall within the scope of the invention.

Data structure 500 may be a circular buffer, and may include multiple memory slots, including memory slots 502 and 512, each including a plurality (e.g., 32) slots such as, for example, slots 504-508 and 514-518, respectively. Index 520 ("SndNext") indicates the next position in the memory allocated for the connection at which the sampled information will be stored. Index 510 ("RcvNext") indicates the next entry including sampled information for which an ACK corresponding to the sampled information is expected (e.g., an earliest entry for which an ACK has not yet been received). For example, entry 506 may already include a timestamp generated for a piece of information when a packet including the piece of information was transmitted on the connection, and for which an ACK has not yet been received, but is expected next. When the ACK for a packet corresponding to the piece of information is received, the timestamp of the packet may be added to entry 506. The difference between the two timestamps now included in the entry may be used to determine the RTT for the piece of information. This RTT may be used to determine a change in RTT, which may be a congestion control event, may be reported to a CCM for the connection, and may result in a change in memory allocation as described below.

Indexes 510 and 520 may be used to determine the amount of data in flight for a connection at a given time. For example, the amount of data in flight for a connection at a given time may be determined as RttSampleTable[SndNext].Seq—RttSampleTable[RcvNext].Seq.

To monitor an actual number of samples allocated to a connection, two variables per connection may be utilized: ActualSamples; and AssignedSamples. ActualSamples may track an exact number of blocks actually allocated to a connection. AssignedSamples may be the amount the connection can potentially use, which is based on the congestion window for the connection. However, memory is not actually allocated (and reflected by ActualSamples) unless the connection actually tries to send a congestion window-worth of data. AssignedSamples is always >= ActualSamples.

Upon a connection being created, the connection may (e.g., by default) be assigned a single block of 32 samples, and AssignedSamples may be set equal to ActualSamples; i.e., both may be set equal to 1 (i.e., 1 block of data).

As data is being sent on the connection, indexes 510 and 520 may track the amount of data in flight, e.g., RttSampleTable[SndNext].Seq—RttSampleTable[RcvNext].Seq. The next entry within the data structure 500 at which to store a sample may be determined based on the assigned samples; e.g., (SndNext+1) % AssignedSamples*CTCP_DWND_RTT_SAMPLES_NUM. If this calculated value is greater than ActualSamples*CTCP_DWND_RTT_SAMPLES_NUM, then a new block (e.g., another 32 sample entries) may be allocated from the memory pool and the value of ActualSamples may be increased by 1. If the allocation of a new block fails, then AssignedSamples may be set equal to ActualSamples, and the value of index 520 ("SndNext") recomputed.

If data structure 500 is full (i.e., the amount of memory actually allocated to the connection has met the amount of assigned memory), then the sample may not be recorded.

A sample may be recorded as along as the sampling rate for the given connection allows it (and there is memory space still available in the pool). For example, per Table 1 and FIG. 4, if the connection speed (i.e., bandwidth) for the connection is 1 Gbps and the RTT is currently set at 100 ms, 128 samples (e.g., 4 blocks worth of memory space) may be sampled per round, i.e., per congestion window.

One or more events may be performed at the end of every round. As noted above, a round ends when we an ACK for a last segment of a round is received. For example, when a round ends, the congestion window may be recomputed, and the sampling rate may be reconfigured as (recomputed congestion window) % AssignedSamples*CTCP_DWND_RTT_SAMPLES_NUM.

Further, when a round ends, it may be decided whether there are unused entries from data structure 500 that have been allocated to the connection that can be released back into the memory pool. This decision may be based on where indexes 510 and 520 are located within data structure 500. For example, for a particular block (e.g., 502 or 512), if both 510 and 520 are not in a block, the block can be freed (and connection state variables may be readjusted). If 510 and 520 are in a same block, all of the blocks in data structure 500, if any, following such a block may be released. In an embodiment in which data structure 500 is a circular buffer, another technique is to locate index 520 ("SndNext") in data structure 500, and delete all following blocks until the block having an entry to which index 510 ("RcvNext") points.

Using the above described memory allocation/de-allocation techniques, if a connection is always transmitting an amount of data commensurate with its congestion window, then allocated memory of the memory pool (e.g., blocks of data structure 500) is not released. Otherwise, unused memory space is returned to the memory pool, and can be used by other connections.

Figure 6:
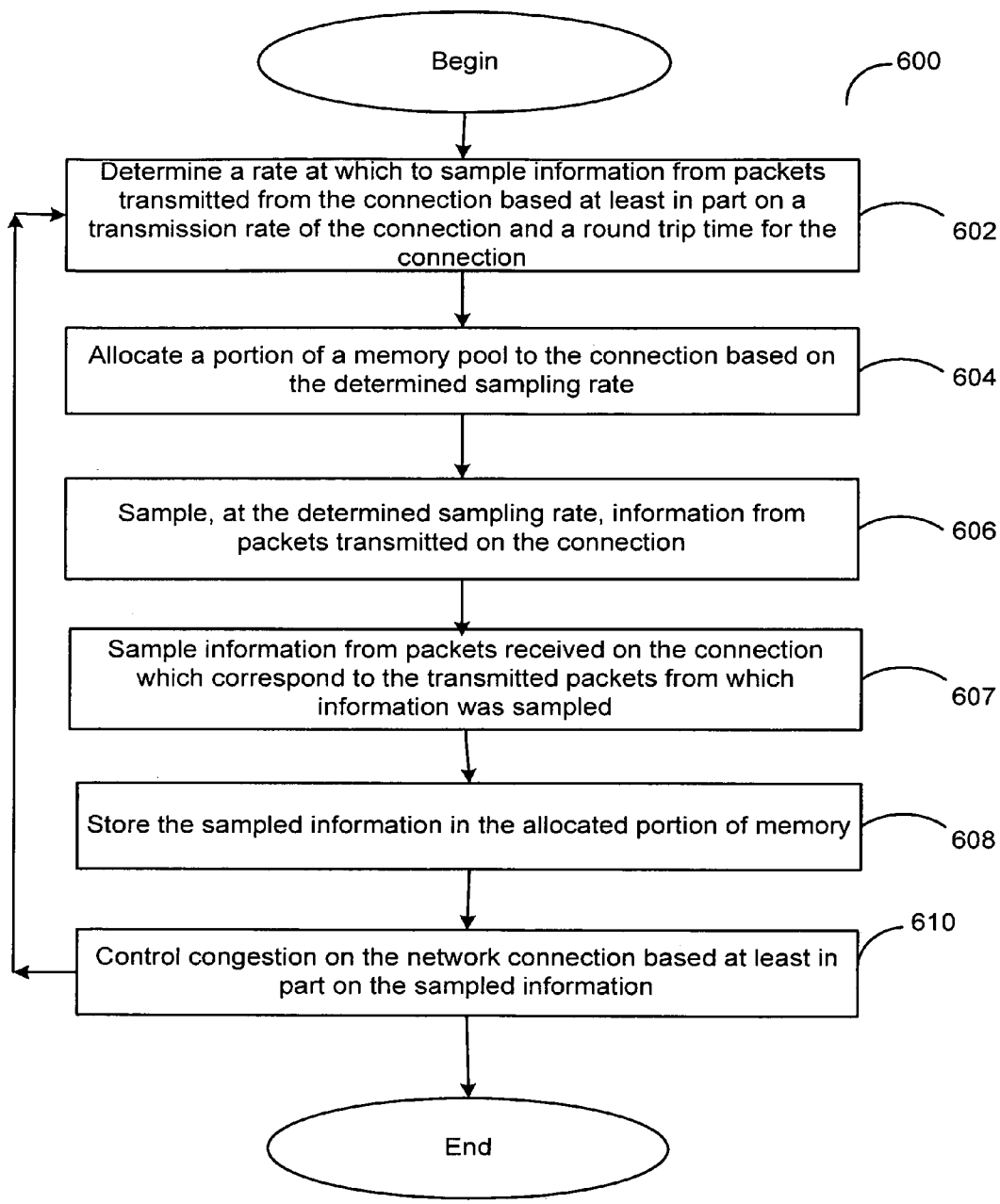
FIG. 6 in the flow chart illustrating an example of a method of controlling congestion on a network connection, according to some embodiments of the invention.

FIG. 6 is a flow chart illustrating an example of a method 600 of controlling congestion on a network connection, according to some embodiments of the invention, for example, based on the foregoing discussion of RTT sampling. It should be appreciated that method 600 is merely an illustrative embodiment of a method of controlling congestion on a network connection, and is not intended to limit the scope of the invention. Any of numerous other implementations of such a method, for example, variations of method 600, are possible and are intended to fall within the scope of the invention.

In Act 602, a rate at which to sample information from packets received on the connection is determined based at least in part on a transmission rate of the connection and a round trip time for the connection, for example, as described above.

A portion of a memory pool (e.g. one or more blocks of data structure 500) may be allocated to the connection in Act 604 based on the determined sampling rate.

In Act 606, information from packets received on the connection may be sampled at the determined sampling rate, and, in Act 608, the sampled information may be stored in the allocated portion of memory, for example, in an entry of structure 500. Further, in Act 607, information may be sampled from incoming packets received on the connection, where these packets correspond to packets sampled in Act 606, and this information may be stored in the allocated memory. For example, as describe above, a timestamp for a piece of information (i.e., a segment) may be stored in an entry of data structure 500. When a packet is later received that includes an ACK for the piece of information, the timestamp for this packet may be stored in the same entry.

In Act 610, congestion on the network connection may be controlled based at least in part on the sampled information. For example, as described above, the RTT of a piece of information may be determined based on the two timestamps sampled for a piece of information, and this RTT may be used to control congestion. For example, at the end of a round, it may be determined that the RTT of a connection has changed, and this may be reported to the corresponding CCM, which may modify its control of congestion on the connection accordingly, as described above.

As shown by the arrow pointing from Act 610 to Act 602, the control of congestion on a connection and the amount of memory of the memory pool allocated to the connection may be adjusted based on the sampled information.

Method 600 may include additional acts. Further, the order of the acts performed as part of method 600 is not limited to the order illustrated in FIG. 5, as the acts may be performed in other orders and/or one or more of the acts may be performed in parallel, at least partially. For example, any of acts 602-510 may be performed for one connection and currently any of acts 602-510 being performed for another connection.

Some operating systems provide an API that provides a running count that can be used by applications on the operating system. For example, some operating systems available from Microsoft Corporation provide an API called KeQueryPerformanceCounter, which provides the finest-grained running count available on the operating system. However, a call to this API is very expensive, and calling it too frequently can degrade the performance of the network device on which the operating system resides.

Accordingly, in some embodiments of the invention, a timestamp (e.g., timestamp 118) for an incoming packet (e.g., 126) is generated on a network interface module (e.g., by timestamp generator 124 of module 122) that is separate from the operating system (e.g., 104) and the network communications stack (e.g., 110) of the network device (e.g., 102) at which the packet is received. The timestamp may be used to determine an RTT of the connection, which may be used to control congestion on the connection, as will be described in more detail below.

The timestamp may be captured on the network interface module as close as possible to a time at which a packet is received, and included within a data structure that is made available to the network communications stack 110, as is described below in more detail. Thus, for each packet received at the network interface module, a timestamp may be recorded that more accurately reflects the time at which a packet is received than if the timestamp were generated by the operating system. Thus, even if there is a delay between when a packet is received at the network interface module and the time it is sent to the network communications stack, the timestamp still accurately indicates when the packet was actually received on the network device. Further, operating system resources are freed from the burden of generating the timestamp, which may provide a less expensive solution for controlling congestion on the network device.

Figure 7:
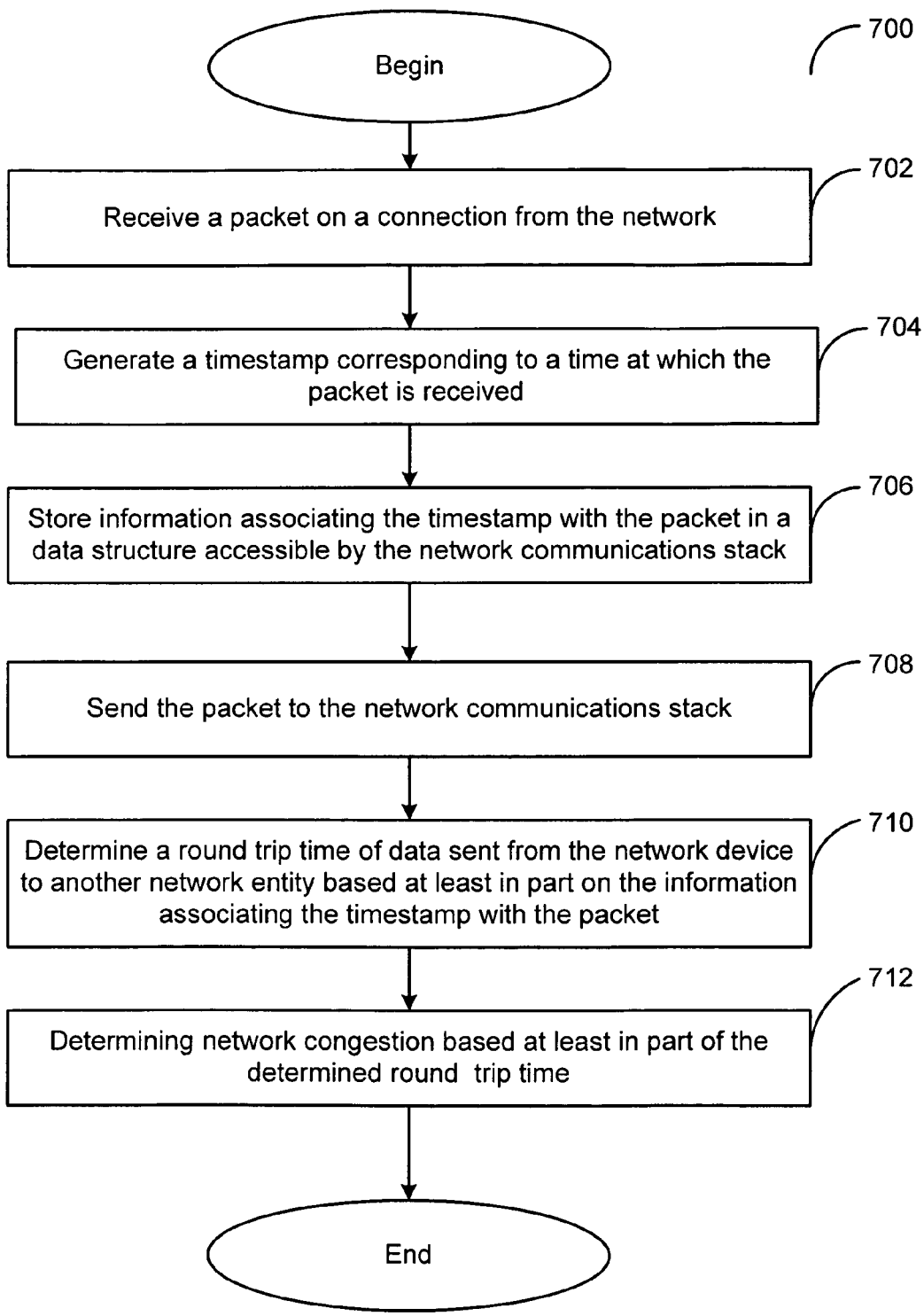
FIG. 7 illustrates an example of a method of controlling congestion on a network connection, according to some embodiments of the invention.

FIG. 7 is a flowchart illustrating a method 700 of controlling congestion on a network connection between a network device and a communications network, the network device comprising a network communications stack and a separate network interface component, according to some embodiments of the invention.

In Act 702, a packet (e.g., 126) may be received on the connection from the network, for example, at network interface module 122 as described above.

A timestamp (e.g, 118) corresponding to a time at which the packet is received may be generated in Act 704, for example, by timestamp generator 124 of module 122.

In Act 706, information associating the timestamp with the packet may be stored in a data structure accessible by the network communications stack. For example, in embodiments of the invention in which a Windows®Vista™ operating system are employed, Act 706 may include storing the information associating the timestamp with the packet in a NET_BUFFER and/or NET_BUFFER LIST data structure.

The packet may be sent to the network communications stack (e.g., 110) in Act 708, for example, as described above in relation to system 100.

In Act 710, an RTT of a data sent from the network device to another network entity may be determined based at least in part on the information associating the timestamp and the packet. For example, a timestamp may have been generated when a piece of data was transmitted from a network device to another network entity. An RTT of a connection may be determined by determining the difference between the timestamp that indicates when this piece of data was transmitted and the timestamp generated in Act 704 for an acknowledgement indicating that the piece of data was received by the network entity.

In Act 712, network congestion may be determined based at least in part on the determined round trip time. For example, if the RTT determined in Act 710 is indicative of a change in RTT for the connection, this change may be reported to the CCM controlling congestion on the connection, for example, as described above in relation to system 100. The CCM then may update connection state variables for the connection, and report the updated variables to the network communications *-stack (e.g., 110) which then may alter the control of the connection, for example, as described above.

Method 700 may include additional acts. Further, the order of the acts performed as part of method 400 is not limited to the order illustrated in FIG. 4, as the acts may be performed in other orders and/or one or more the acts may be performed in parallel, at least partially. For example, Act 708 may be performed before or concurrently to act 706.

Methods 300, 600 and 700, and acts thereof, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (including methods 300, 600 and 700 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 100, 200, 800 and 900 described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, any of the computer systems described in relation to FIGS. 1, 2, 8 and 9, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

Figure 8:
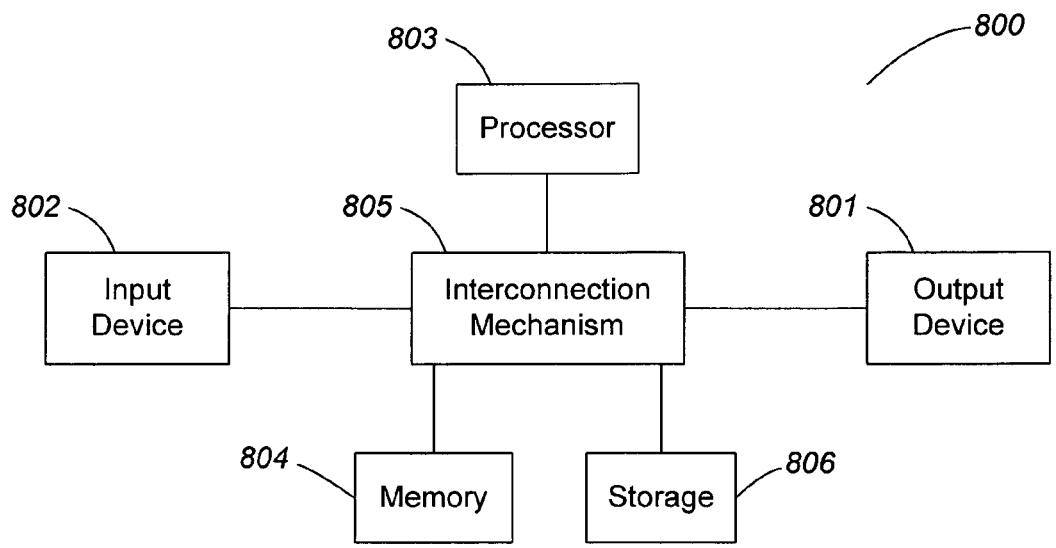
FIG. 8 is a block diagram illustrating an example of a computer system on which some embodiments of the invention may be implemented.

For example, various aspects of the invention may be implemented as specialized software executing in a general-purpose computer system 800 such as that shown in FIG. 8. The computer system 800 may include a processor 803 connected to one or more memory devices 804, such as a disk drive, memory, or other device for storing data. Memory 804 is typically used for storing programs and data during operation of the computer system 800. Components of computer system 800 may be coupled by an interconnection mechanism 805, which may include one or more busses (e.g., between components that are integrated within a same machine) and/or a network (e.g., between components that reside on separate discrete machines). The interconnection mechanism 805 enables communications (e.g., data, instructions) to be exchanged between system components of system 800. Computer system 800 also includes one or more input devices 802, for example, a keyboard, mouse, trackball, microphone, touch screen, and one or more output devices 801, for example, a printing device, display screen, speaker. In addition, computer system 800 may contain one or more interfaces (not shown) that connect computer system 800 to a communication network (in addition or as an alternative to the interconnection mechanism 805).

Figure 9:
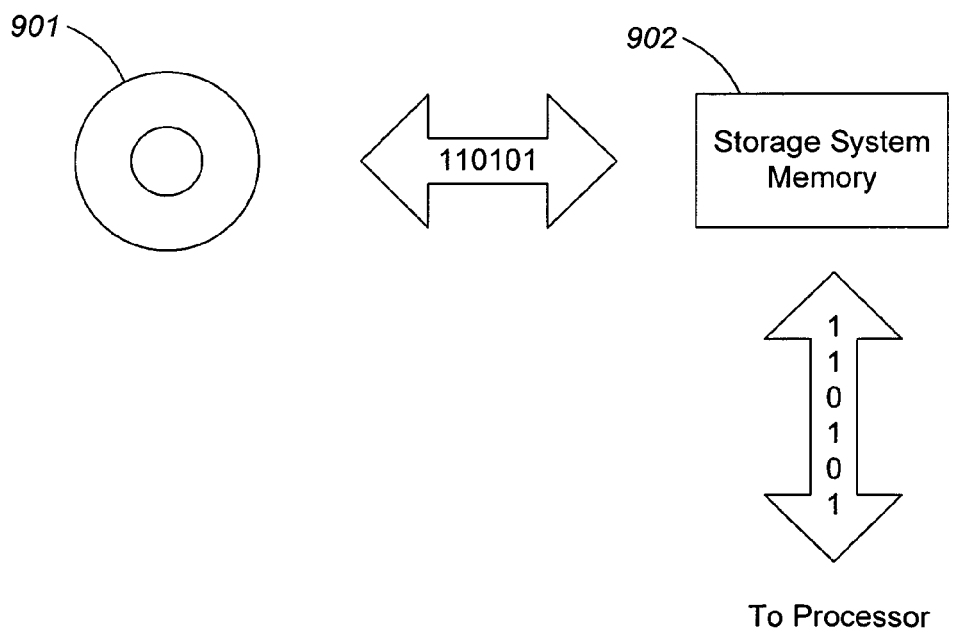
FIG. 9 is a block diagram illustrating an example of a storage system that may be used as part of the computer system to implement some embodiments of the invention.

The storage system 806, shown in greater detail in FIG. 9, typically includes a computer readable and writeable nonvolatile recording medium 901 in which signals are stored that define a program to be executed by the processor or information stored on or in the medium 901 to be processed by the program. The medium may, for example, be a disk or flash memory. Typically, in operation, the processor causes data to be read from the nonvolatile recording medium 901 into another memory 902 that allows for faster access to the information by the processor than does the medium 901. This memory 902 is typically a volatile, random access memory such as a dynamic random access memory (DRAM) or static memory (SRAM). It may be located in storage system 806, as shown, or in memory system 804, not shown. The processor 803 generally manipulates the data within the integrated circuit memory 804, 902 and then copies the data to the medium 901 after processing is completed. A variety of mechanisms are known for managing data movement between the medium 901 and the integrated circuit memory element 804, 902, and the invention is not limited thereto. The invention is not limited to a particular memory system 804 or storage system 806.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system shown in FIG. 8. Various aspects of the invention may be practiced on one or more computers having a different architecture or components that that shown in FIG. 8.

Computer system 800 may be a general-purpose computer system that is programmable using a high-level computer programming language. Computer system 800 also may be implemented using specially-programmed, special-purpose hardware. In computer system 800, processor 803 is typically a commercially available processor such as the well-known Pentium class processor available from the Intel Corporation. Many other processors are available. Such a processor usually executes an operating system which may be, for example, the Windows® 95, Windows® 98, Windows NT®, Windows®2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A network device for controlling congestion on one or more network connections between the network device and a communications network, comprising:
   a processor; and
   a memory containing computer-executable instructions that, when executed by the processor, perform a method for controlling congestion on one or more network connections between the network device and the communications network, the computer-executable instructions defining:
   a network communications stack operative to control network communications on the one or more connections; and
   congestion control modules, each congestion control module defining a congestion control algorithm to control congestion on a respective one of the one or more network connections and maintaining one or more connection state variables for the respective connection,
   the network communications stack being operative, for each of the one or more connections, to select one of the congestion control modules based on characteristics of the network connection, to control network communications on the network connection using the selected congestion control module and to notify the selected congestion control module of one or more transport control events that occur on the connection.

2. The network device of claim 1, wherein each congestion control module is operative to update one or more connection state variables in response to being notified of a transport control event that occurred on the connection for which the congestion control module controls congestion.

3. The network device of claim 2, wherein each congestion control module is operative to notify the network communications stack of the updated one or more connection state variables for the connection for which the congestion control module controls congestion.

4. The network device of claim 3, wherein the network communications stack is operative to control network communications on the one or more connections based on the updated one or more connection state variables it receives from the one or more congestion control modules.

5. The network device of claim 1, further comprising:
   a plurality of congestion control module abstractions, each congestion control module abstraction defining a type of congestion control module,
   wherein the network communications stack is operative to select a first of the plurality of congestion control module abstractions for a first of the one or more connections and to create a first of the congestion control modules from the first congestion control module abstraction.

6. The network device of claim 5, wherein, the network communications stack is operative to select the first of the plurality of congestion control module abstractions for a second of the one or more connections and to create a second of the congestion control modules from the first congestion control module abstraction.

7. The network device of claim 1, wherein the network communications stack is a TCP/IP stack.

8. A computer-readable storage medium encoded with computer-executable instructions that, as a result of being executed by a computer, control the computer to perform a method of controlling congestion on a network connection between a network device and a communications network, the method comprising acts of:
   (A) selecting, by the network device, a first type of congestion control for a first connection, the first type of congestion control being selected from a plurality of congestion control types based on characteristics of the network connection;
   (B) generating, by the network device, a first congestion control module of the first type; and
   (C) controlling, by the network device, network congestion on the first connection using the first congestion control module.

9. The computer-readable storage medium of claim 8, wherein the network device has access to a plurality of congestion control module abstractions, each congestion control module abstraction defining a type of congestion control module,
   wherein the act (A) comprises selecting a first of the plurality of congestion control module abstractions, the first congestion control module abstraction defining the first type of congestion control module, and
   wherein the act (B) comprises generating the first congestion control module using the first congestion control module abstraction.

10. The computer-readable storage medium of claim 8, wherein the method further comprises:
    (D) selecting the first type of congestion control for a second connection;
    (E) generating a second congestion control module of the first type; and
    (F) controlling network congestion on the second connection using the second congestion control module.

11. The computer-readable storage medium of claim 8, wherein the method further comprises:
    (D) selecting a second type of congestion control for a second connection;
    (E) generating a second congestion control module of the second type; and
    (F) controlling network congestion on the second connection using the second congestion control module,
    wherein the second type is different than the first type.

12. The computer-readable storage medium of claim 8, wherein the acts (A)-(C) are performed by a TCP/IP stack.

13. The computer-readable storage medium of claim 8, further comprising:
    (D) notifying the first congestion control module of one or more transport control events that occur on the connection.

14. The computer-readable storage medium of claim 13, the method further comprising an act of:
    (E) the first congestion control module updating one or more connection state variables in response to the notifying.

15. The computer-readable storage medium of claim 14, wherein the acts (A)-(C) are performed by a network communications stack,
    wherein the act (C) comprises controlling network communications on the first connections based on the updated one or more connection state variables; and
    wherein the method further comprising an act of the first congestion control module notifying the network communications stack of the updated one or more connection state variables.

* * * * *